United States Patent
Gurevich et al.

(10) Patent No.: US 8,656,381 B2
(45) Date of Patent: Feb. 18, 2014

(54) PRESENTING MACHINE INSTRUCTIONS IN A MACHINE-INDEPENDENT TREE FORM SUITABLE FOR POST-LINK OPTIMIZATIONS

(75) Inventors: Maxim Gurevich, Netanya (IL); Gad Haber, Nesher (IL); Roy Levin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1934 days.

(21) Appl. No.: 11/635,136

(22) Filed: Dec. 7, 2006

(65) Prior Publication Data

US 2008/0141233 A1 Jun. 12, 2008

(51) Int. Cl.
*G06F 9/45* (2006.01)

(52) U.S. Cl.
USPC ............ 717/159; 717/144; 717/153; 717/156

(58) Field of Classification Search
None
See application file for complete search history.

(56) References Cited

U.S. PATENT DOCUMENTS

| | | | | |
|---|---|---|---|---|
| 5,590,331 A * | 12/1996 | Lewis et al. | | 717/144 |
| 5,724,494 A * | 3/1998 | Politis | | 345/592 |
| 5,745,121 A * | 4/1998 | Politis | | 345/619 |
| 5,748,961 A * | 5/1998 | Hanna et al. | | 717/145 |
| 5,836,014 A * | 11/1998 | Faiman, Jr. | | 717/156 |
| 5,937,188 A * | 8/1999 | Freeman | | 717/104 |
| 5,956,512 A * | 9/1999 | Simmons et al. | | 717/128 |
| 5,963,739 A * | 10/1999 | Homeier | | 717/126 |
| 5,966,539 A * | 10/1999 | Srivastava | | 717/156 |
| 6,011,919 A * | 1/2000 | Politis et al. | | 717/114 |
| 6,021,272 A | 2/2000 | Cahill et al. | | |
| 6,026,241 A * | 2/2000 | Chow et al. | | 717/152 |
| 6,128,775 A * | 10/2000 | Chow et al. | | 717/156 |
| 6,191,797 B1 * | 2/2001 | Politis | | 345/440 |
| 6,327,699 B1 * | 12/2001 | Larus et al. | | 717/128 |
| 6,571,387 B1 * | 5/2003 | Chow et al. | | 717/156 |
| 6,772,413 B2 * | 8/2004 | Kuznetsov | | 717/136 |
| 7,249,345 B2 * | 7/2007 | Zorc | | 717/106 |
| 7,299,458 B2 * | 11/2007 | Hammes | | 717/133 |
| 7,310,799 B2 * | 12/2007 | Eisenberg et al. | | 717/159 |
| 7,707,568 B2 * | 4/2010 | Kawahito et al. | | 717/159 |
| 7,716,632 B2 * | 5/2010 | Covely, III | | 717/106 |
| 8,296,750 B2 * | 10/2012 | Kawahito | | 717/160 |
| 2003/0028551 A1 * | 2/2003 | Sutherland | | 707/200 |
| 2004/0010782 A1 * | 1/2004 | Moritz | | 717/151 |
| 2004/0088685 A1 * | 5/2004 | Poznanovic et al. | | 717/140 |
| 2004/0088689 A1 * | 5/2004 | Hammes | | 717/154 |
| 2004/0088691 A1 * | 5/2004 | Hammes et al. | | 717/158 |
| 2004/0128662 A1 * | 7/2004 | Eisenberg et al. | | 717/159 |
| 2005/0273769 A1 * | 12/2005 | Eichenberger et al. | | 717/136 |

(Continued)

OTHER PUBLICATIONS

Aho et al., "Optimal Code Generation for Expression Trees", Journal of the Association for Computing Machinery, vol. 23, No. 3, Jul. 1976, pp. 488-501.*

(Continued)

*Primary Examiner* — Tuan Q. Dam
*Assistant Examiner* — Zheng Wei
(74) *Attorney, Agent, or Firm* — Daniel Kligler

(57) ABSTRACT

A machine-independent representation of computer instructions can serve as a standard for machine instruction description that is suitable for post-link transformation tools, such as post-link optimizers, and for education of users. In one embodiment the instructions are presented as expression trees in a XML file. An optimizer operates on the transformed code representations, after which optimized code is re-transformed into machine-readable code.

13 Claims, 5 Drawing Sheets

(56) References Cited

U.S. PATENT DOCUMENTS

| | | | |
|---|---|---|---|
| 2005/0273772 A1* | 12/2005 | Matsakis et al. | 717/136 |
| 2006/0200811 A1* | 9/2006 | Cheng | 717/144 |
| 2006/0206876 A1* | 9/2006 | Barton et al. | 717/137 |
| 2008/0141233 A1* | 6/2008 | Gurevich et al. | 717/159 |
| 2009/0157721 A1* | 6/2009 | Tal | 707/102 |

OTHER PUBLICATIONS

Reiss et al., "PECAN: Program Development Systems that Support Multiple Views", IEEE Transactions on software engineering, vol. Se-11, No. 3, Mar. 1985, pp. 276-285.*

Pelegri-Llopart et al., Optimal Code Generation for Expression Trees: An application of BURS Theory, publihsed by ACM, 1988, pp. 294-308.*

B. Wess, Automatic Instruction Code Generation Based On Trellis Diagrams, published by IEEE, 1992, pp. 645-648.*

B. De Bus et al., "Post-pass compaction techniques", Communications of the ACM, v 46, n 8, Aug. 2003, p. 41-6.

B. De Sutter et al., "Sifting out the mud: Low level C++ code reuse", Proceedings of the Conference on Object-Oriented Programming Systems, Languages, and Applications, OOPSLA, 2002, p. 275-29.

M. Franz et al., "Slim binaries", Communications of the ACM, v 40, n 12, Dec. 1997, p. 87-94.

D. Ung et al., "Dynamic re-engineering of binary code with run-time feedbacks", Proceedings Seventh Working Conference on Reverse Engineering, 2000, p. 2-10.

David W. Wall, "Systems for Late Code Modification", WRL Technical Note TN-19, Western Research Laboratory, Digital Equipment Corporation, Palo Alto, CA; Jun. 1991.

* cited by examiner

FIG. 8

[ Previous | Next | Table of Contents | Index | Library Home | Legal |Search ]

Assembler Language Reference
addi (Add Immediate) or cal (Compute Address Lower) Instruction Purpose
Calculates an address from an offset and a base address and places the result in a general-purpose register.

Syntax

| Bits  | Value |
|-------|-------|
| 0-5   | 14    |
| 6-10  | RT    |
| 11-15 | RA    |
| 16-31 | SI/D  |

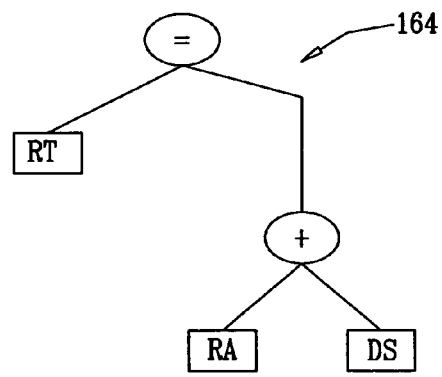

PowerPC
addi      *RT, RA, SI*

POWER family
cal       *RT, D( RA)*

See Extended Mnemonics of Fixed-Point Arithmetic Instructions and Extended Mnemonics of Fixed-Point Load Instructions for more information.

Description
The addi and cal instructions place the sum of the contents of general-purpose register (GPR) *RA* and the 16-bit two's complement integer *SI* or *D*, sign-extended to 32 bits, into the target GPR *RT*. If GPR *RA* is GPR 0, then *SI* or *D* is stored into the target GPR *RT*.

The addi and cal instructions have one syntax form and do not affect Condition Register Field 0 or the Fixed-Point Exception Register.

Parameters

*RT* Specifies target general-purpose register where result of operation is stored.

US 8,656,381 B2

PRESENTING MACHINE INSTRUCTIONS IN A MACHINE-INDEPENDENT TREE FORM SUITABLE FOR POST-LINK OPTIMIZATIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

Computer program listing appendices are submitted herewith on one compact disc and one duplicate compact disc. The total number of compact discs including duplicates is two. The files on the compact discs are ASCII text files in which the characters are displayed as their corresponding values in hexadecimal format. Their names, dates of creation, directory locations, and sizes in bytes are:

The root folder contains the file "59858 Computer Program Listings.txt" of Nov. 8, 2006 and of length 12,880 bytes, containing Listings 1-4.

The material on the compact discs is incorporated by reference herein.

BACKGROUND OF THE INVENTION

1. Field of the Invention

This invention relates to computer software. More particularly, this invention relates to a representation of computer program instructions in a form suitable for post-link optimization.

2. Description of the Related Art

Post-link optimization tools are widely used today for applying a wide range of optimizations on executable files in order to improve performance, reduce power consumption and improve space utilization.

Optimizations applied directly to post-linked program executables have been shown to be highly effective in producing significant performance gain. Large programs tend to be compiled using separate compilation units, i.e., one or several files at a time. As a result, a compiler cannot fully realize transformations and optimizations applied on the program as a whole, even when performing sophisticated inter-procedural analysis. For example, global code reordering is an optimization, which is suitable to be applied at the post-link stage.

Furthermore, some program information is not known until completion of the linkage build stage, e.g., the final location of global variables. As a result, some optimizations, such as global data reordering and other optimizations that follow global data restructuring, are most effective when applied to the final program file.

U.S. Pat. No. 6,021,272, issued to Cahill, et al., proposes transforming and manipulating program object code. A set of program object code is transformed into a platform-independent form. The platform-independent form of the object code is represented as a linked list of pseudo-assembly code instructions, with each such instruction coupled to a set of symbol and relocation tags for that instruction. A platform-independent assembly code manipulator inserts, deletes, and rearranges, and modifies instructions. Afterward, a reassembler may produce new object code from the platform-independent assembly code.

SUMMARY OF THE INVENTION

An embodiment of the invention provides a method for computer program optimization, which is carried out by representing machine instructions as respective expression trees, in which nodes represent operators and leaves represent machine resources and operations. The method is further carried out by generating transformed code, which is accomplished by converting an input sequence of machine instructions in a computer program into an input set of respective expression trees, optimizing the transformed code to yield a modified set of expression trees, and converting the modified set of expression trees into an optimized sequence of machine instructions. Embodiments of the invention are realized as computer software product and data processing apparatus.

An embodiment of the invention provides a method of representing computer instructions machine-independently, which is carried out by representing machine instructions of an instruction set as respective expression trees in which nodes represent operators and leaves represent machine resources and operations. The method is further carried out by displaying the expression trees as human-readable expression trees for user education.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 8 is a portion of a user manual describing a machine instruction, in accordance with a disclosed embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems.

Overview.

Disclosed embodiments of the invention provide a machine-independent representation of computer instructions. The representation can serve as a standard for machine instruction description that is suitable for post-link transformation tools, such as post-link optimizers, and for education of users. In one embodiment, machine instructions are presented as expression trees in an Extensible Markup Language (XML) file. An optimizer operates on expression trees, which are transformations of respective machine code instructions, to generate optimized rearrangements and modifications of the transformed code. The optimized transformed code is re-converted into machine-readable code.

Figure 1:
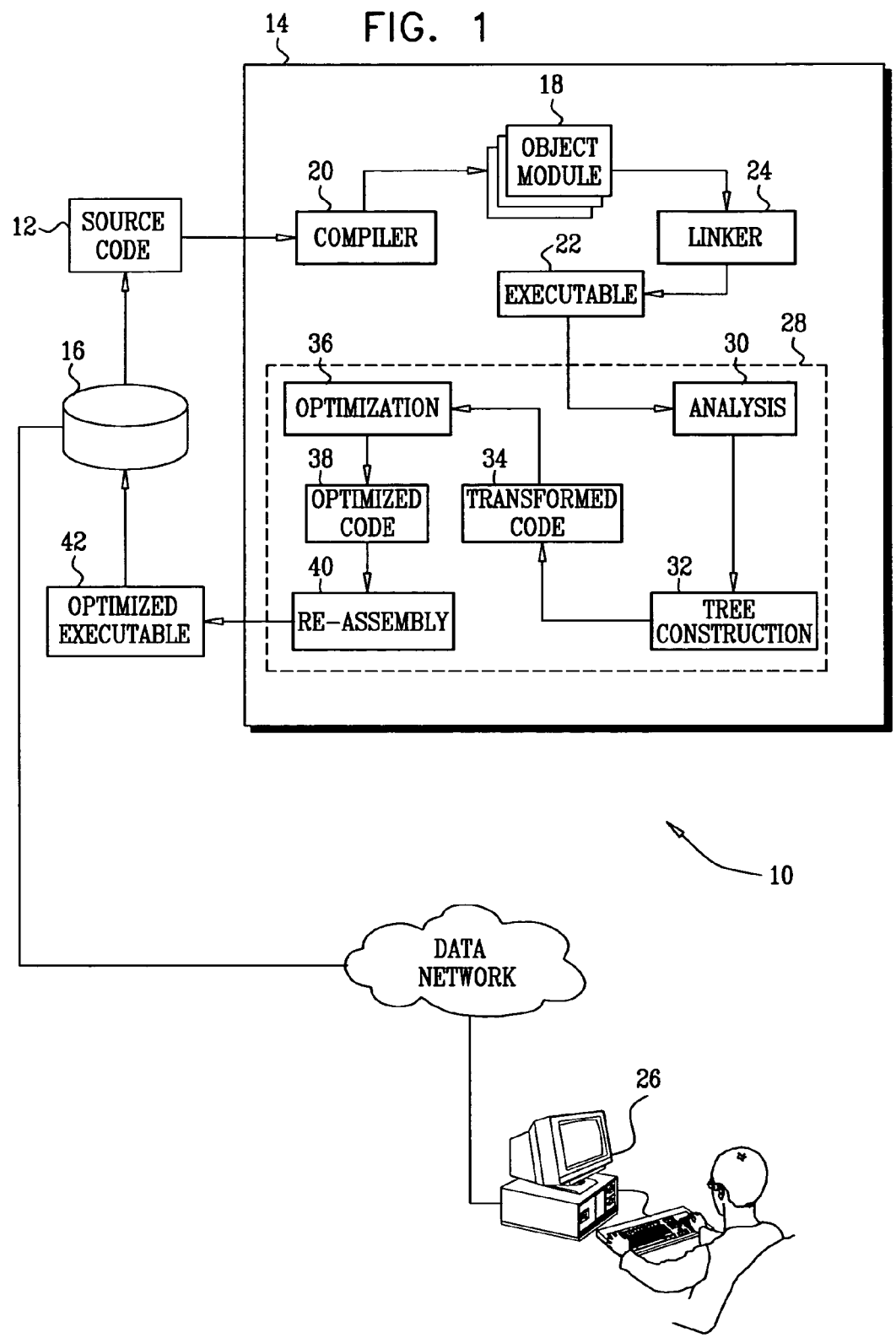
FIG. 1 is a block diagram of a system that is suitable for carrying out an embodiment of the invention.

Turning now to the drawings, reference is initially made to FIG. 1, which is a block diagram of a system 10 that is suitable for carrying out the invention. The system 10 typically comprises a general purpose or embedded computer processor, which is programmed with suitable software for carrying out the functions described hereinbelow. Thus, although the system 10 is shown as comprising a number of separate functional blocks, these blocks are not necessarily separate physical entities, but rather represent different computing tasks or data objects stored in a memory that is accessible to the processor. These tasks may be carried out in software running on a single processor, or on multiple processors. The software may be embodied on any of a variety of known media for use with a computer system, such as a diskette, or hard drive, or CD-ROM. The code may be distributed on such media, or may be distributed to the system 10 from the memory or storage of another computer system over a network. Alternatively or additionally, the system 10 may comprise a digital signal processor or hard-wired logic.

Source code 12 is obtained by a processor 14 from a file storage unit 16. The source code 12 typically comprises multiple modules, which are compiled into object code modules 18 by a compiler 20, and then linked into executable code 22 by a linker 24. The compiler 20 and linker 24 are conventional, tailored to the needs of the particular computer language in which the source code 12 is written, the requirements of a target computer 26, and the operating system of the processor 14.

The executable code 22 is submitted to a post-link transformation module 28, where it is initially processed by an analysis module 30, which is configured according to the architecture of the target computer 26 that actually executes the program specified by the source code 12, which need not have the same architecture and instruction set as the processor 14. The extent of the code analysis performed by the analysis module 30 is dependent to some extent on the amount of symbolic information retained in the executable code 22.

Data, for example data segments in segmented architectures, are identified in the analysis module 30. Data can be rearranged or relocated, e.g., by grouping frequently referenced data elements together for improved data cache utilization and for enabling other optimizations.

Text, i.e., instruction code, is also identified by the analysis module 30, and submitted to a transformation module 32, which produces a tree-like representation of the instructions, as described in further detail below. The tree-like representation, optionally combined with data, defines transformed code. In some embodiments, data can also be modified by the transformation module 32, for example by "normalization fixers", making it more regular, and can be modified if necessary as a result of code modifications.

Transformed code 34 that is output by the transformation module 32 is submitted to an optimizer 36, which exploits the information provided in the transformed code to produce an optimized version 38 of the transformed code. The optimizer 36 is typically configured to operate on post-link code modules. A conventional optimizer working with a compiler's standard run time library (RTL) representation may be modified by those skilled in the art to work with expression trees instead of the RTL representation. In the optimizer, conventional compiler techniques can be applied to the transformed code, e.g., strength reduction, constant propagation, etc. For example, for constant propagation optimization, the transformation module 32 simply traverses a control flow graph to search for the constant values that are placed in its leaves and then propagates them upwards.

However, in some cases, it may be desirable to process object code in the optimizer 36 even prior to linking. The optimized version 38 retains the instruction tree representation. Finally, the optimized version 38 is reconverted by a reassembly module 40 to optimized executable code 42, which is native machine code for the target computer 26. The optimized executable code 42 may be stored in the file storage unit 16. Additionally or alternatively, the optimized executable code 42 may be distributed to users.

Operation.

Figure 2:
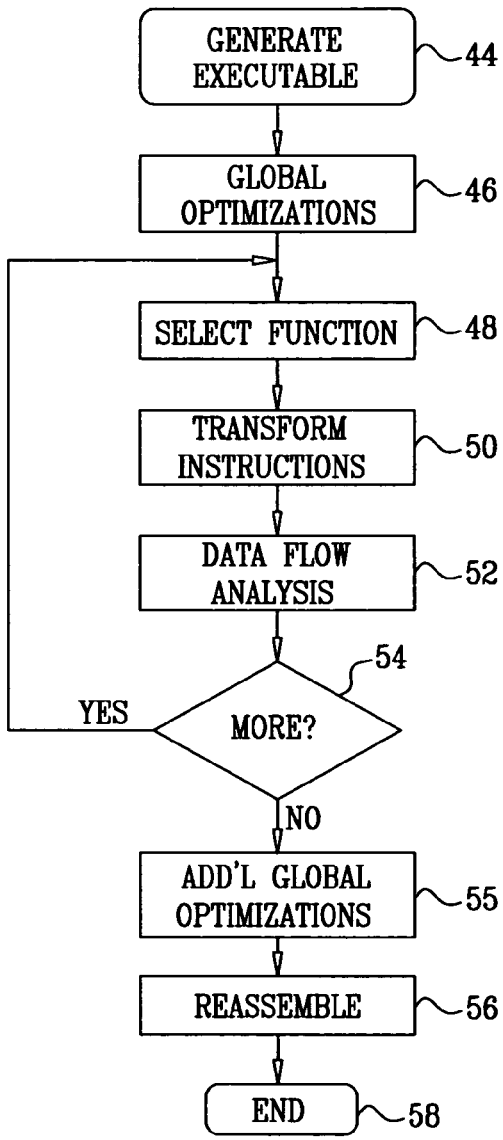
FIG. 2, which is a flow chart of a method of computer program code optimization in accordance with a disclosed embodiment of the invention.

Reference is now made to FIG. 2, which is a flow chart of a method of computer program code optimization in accordance with a disclosed embodiment of the invention. The process steps are shown in a particular linear sequence for clarity of presentation. However, it will be evident that many of them can be performed in parallel, asynchronously, or in different orders.

At initial step 44 program code is compiled and linked to produce an executable module. When the program is a complex suite, the executable module typically derives from a plurality of source and object code modules.

Next, at step 46 the executable code is initially processed. Here some global optimizations are performed, e.g., function in-lining, peephole optimizations.

Next, at step 48 a function in the executable code is selected.

Next, at step 50 the instructions of the current function are each transformed into a control flow graph, which is an expression tree representation. Libraries of expression trees may be maintained to facilitate this step. In one embodiment, the libraries are maintained as XML files containing descriptions of the expression trees. An appropriate expression tree copied from the library is then modified to reflect the actual operands of each instruction of the current function. The expression trees for the current function are added to a stream of expression trees and submitted to data flow analysis in step 52.

Control now proceeds to decision step 54, where it is determined if more functions remain to be transformed. If the determination at decision step 54 is affirmative, then control returns to step 48 to begin another iteration.

If the determination at decision step 54 is negative, then control proceeds to step 55, where additional global optimizations are performed on the transformed code.

Next, at step 56, the optimized code is reassembled into native machine code, and at final step 58 the reassembled code is stored or distributed for execution.

Modeling Program Instructions.

Referring again to FIG. 1, the optimizer 36, accepts machine instructions, and translates them into a new representation that is flexible enough to apply the needed reorganizations and optimizations transformations. The optimizer 36 then translates the transformed and reorganized representation back to legal machine instructions. Generic data structures are used to represent machine instructions in the transformed code 34 and the optimized version 38. These structures are a machine independent assembly representation, which allows basic single instruction machine operations to be defined according to machine resources.

As will become apparent, the tree-like representation disclosed herein facilitates aggressive post-link transformations and optimizations of program code. This approach can be contrasted with conventional representations of machine instructions by use a machine description language (MDL). MDL is typically used by compilers in order to generate machine instructions from source code written in high-level programming languages, e.g., C, C++, and Fortran. MDL, however, is not suitable for post-link optimizers, which employ a direct mapping between native machine instructions and their representation as used in the optimizer.

Each machine instruction is represented as an expression tree, in which nodes represent operators. In some cases nodes can represent machine resources. Branches lead from the assignment operator nodes to other nodes, which represent either machine resources or operations limited to elements of the expression tree. Such "suboperations" can be regarded as virtual or abstract "micro-operations" on the elements of an instruction. Leaf operands represent machine resources. Circles are nodes that represent operators, and rectangles represent a data structure describing machine resources and their properties, e.g., physical size (32 bit or 64 bit), and an alias set, i.e., other affected resources such as condition bits or registers.

The examples that follow are PowerPC™ instructions. In the instructional notation, RS specifies a source general-purpose register containing data, D specifies a 16-bit, signed two's complement integer sign-extended to 32 bits for EA calculation, and RA specifies a source general-purpose register for EA calculation. RT is a target general-purpose register (GPR). SI is a 16-bit two's complement integer SI, sign-extended to 32 bits. RS is a source general-purpose register containing data.

Figure 3:
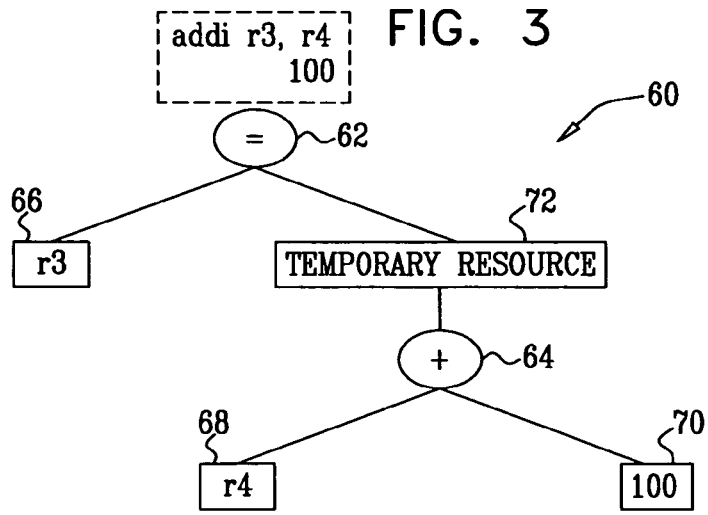
FIG. 3 is a tree-like representation of a machine instruction in accordance with a disclosed embodiment of the invention.

Reference is now made to FIG. 3, which is a tree-like representation of a machine instruction 60 in accordance with a disclosed embodiment of the invention. The machine instruction 60 is an example of the PowerPC "add immediate" instruction, addi RT, RA, SI. The addi instruction places the sum of the contents of a source general-purpose register RA and a 16-bit two's complement integer SI, sign-extended to 32 bits, into a target general-purpose register RT.

Circles 62, 64 are nodes representing operators. An operator may be an assignment operator (=) or a calculation operator (+, −, logical or, logical and, . . . ). In the machine instruction 60, the circle 62 contains an assignment operator. The circle 64 contains a calculation operator.

Rectangles are nodes or leaves that represent machine resources, which may be immediate values such as constants, or actual machine resources such as memory resources or registers. In the machine instruction 60, a rectangle 66 represents a register r3. A rectangle 68 represents a register r4, and a rectangle 70 represents the constant 100. An unspecified temporary resource that transfers the sum of the register r4 and the constant 100 to the register r3 is represented by a rectangle 72. Lines connecting the nodes and leaves are edges that represent execution paths through the tree. The rectangle 72 is included for convenience of implementation, and can be omitted if desired, in order to increase clarity. Temporary resources are used to simplify and regularize tree-based representation elements such as operators and resources.

Figure 4:
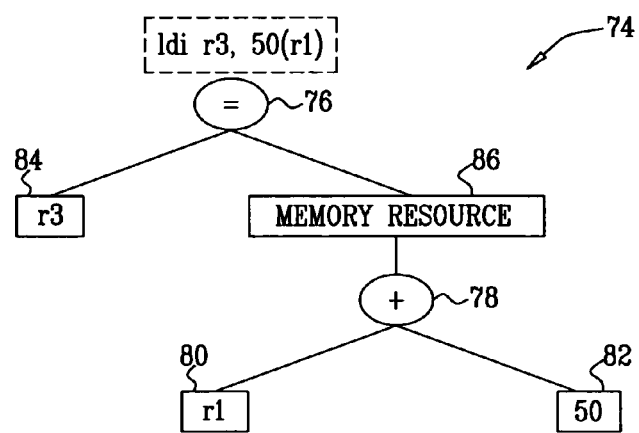
FIG. 4 is a tree-like representation of another machine instruction, in accordance with a disclosed embodiment of the invention.

Reference is now made to FIG. 4, which is a tree-like representation of another machine instruction 74, in accordance with a disclosed embodiment of the invention. The machine instruction 74 is a PowerPC "load double word" instruction, 1$d$ RT, D(RA), which is used in 64-bit versions of the PowerPC processor. The 1$d$ instruction loads a double word in storage from a specified location in memory addressed by the effective address into a target general-purpose register RT. If RA is not zero, the EA is the sum of the contents of RA and D. If GPR RA is zero, then the EA is D. In the example of FIG. 4, the instruction is 1$d$ r3, 50(r1). A circle 76 represents an assignment operator (=), and a circle 78 represents a calculation operator (+). A rectangle 80 connected to the circle 78 represents the register r1, which is the source general-purpose register for EA calculation. A rectangle 82 connected to the circle 78 contains the value 50, which corresponds to D. A rectangle 84 represents the target register of the instruction, in this case the register r3. A rectangle 86 represents a temporary memory resource, which is employed during execution of the instruction. The rectangles 70, 80, 84 are leaves of the tree-like representation of the machine instruction 74, and are all machine resources.

Figure 5:
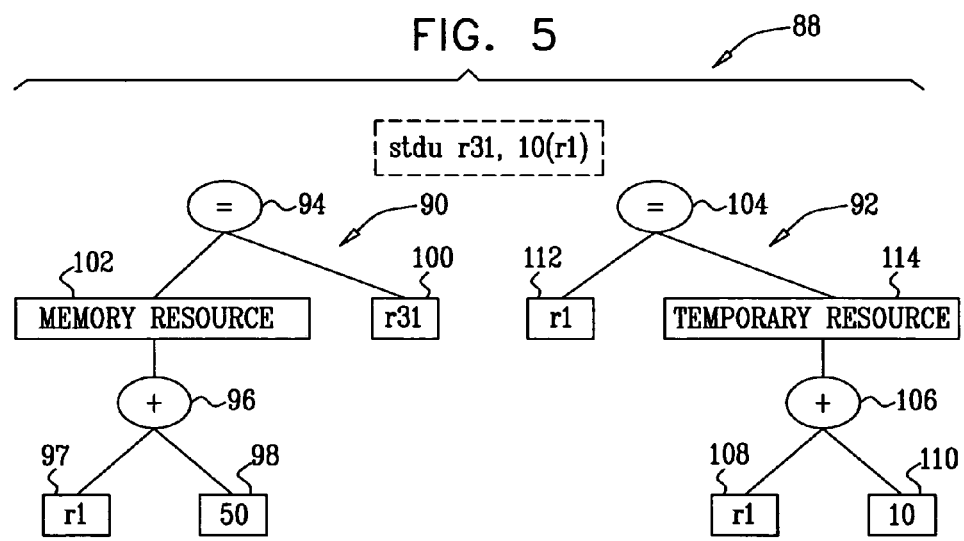
FIG. 5 is a tree-like representation of a more complex machine instruction, in accordance with a disclosed embodiment of the invention.

Reference is now made to FIG. 5, which is a tree-like representation of a more complex machine instruction 88, in accordance with a disclosed embodiment of the invention. The machine instruction 88 is a PowerPC "store double word with up-date" instruction, stdu RS, D(RA). In 64-bit versions of the PowerPC processor, the stdu instruction stores a double-word of data D from a general purpose register into a specified memory location referenced by (EA), and updates the address base. If RA is not zero, the EA is the sum of the contents of RA and D, RA is updated with the EA. If RA is zero, the instruction is invalid. The machine instruction 88 resembles the machine instruction 74 (FIG. 4), but additionally updates the calculated effective address.

The exemplary machine instruction 88, stdu r31 10(r1), is represented by two expression trees 90, 92. The tree 90, at the left side of FIG. 5 details the storage aspect of the instruction. A circle 94 contains the assignment operator (=), and a circle 96 contains the calculation operator (+), for calculation of EA. A rectangle 97 represents RA, which in this case is the register r1. A rectangle 98 represents D, which in this case is the value 10. A rectangle 100 represents the source register RS, which in this case is the register r31. A rectangle 102 indicates an unspecified memory resource used during the implementation of the instruction.

The tree 92 illustrates updating of the effective address to complete the instruction. A circle 104 represents the assignment operator (=), and a circle 106 contains the calculation operator (+). A rectangle 108 represents the register containing the EA to be updated, in this case the register r1. A rectangle 110 represents D, which in this case is the value 10. A rectangle 112 represents the target register that will contain the updated EA, in this case the register r1. A rectangle 114 indicates an unspecified temporary resource used during the implementation of the instruction.

Figure 6:
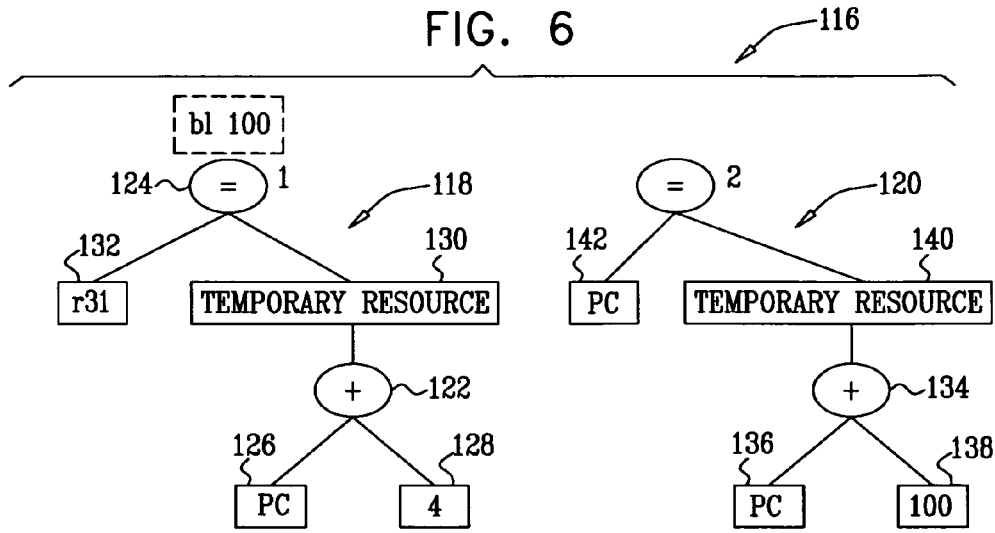
FIG. 6 is a tree-like representation of a control flow machine instruction, in accordance with a disclosed embodiment of the invention.

Control flow instructions are also represented as expression tree-like structures. Reference is now made to FIG. 6, which is a tree-like representation of a control flow machine instruction 116, in accordance with a disclosed embodiment of the invention. The machine instruction 116 is a form of the PowerPC "branch" instruction, b1, which branches to another instruction specified by the branch target address. In this form, the branch target address is computed by concatenating a 24-bit LI field. This field is calculated by subtracting the address of the instruction from the target address and dividing the result by 4 and b'00'. The notation b'00' means that after applying a "shift left" operation twice, two zero bits are placed at the two right-most positions. The result is then sign-extended to 32 bits and added to the address of the branch instruction.

The machine instruction 116 (b1 100) is represented by two expression trees 118, 120. In the tree 118, circles 122, 124 represent assignment and calculation operators, respectively. The circle 122 illustrates the incrementation of the program counter PC by four. The program counter, is, of course a critical machine resource, and is represented by a rectangle 126. The value 4 is a constant, which is treated as a machine resource. It is shown as a rectangle 128. An unspecified temporary resource is shown as a rectangle 130. The result of the calculation is placed in the link register of the PowerPC, which serves as a return address. The link register, an important machine resource in the PowerPC, is represented by a rectangle 132. It will be noted that the rectangles 126, 128, 132 are all leaves of the tree 118.

The tree 120 illustrates further operations on the program counter. A group represented by a circle 134 and rectangles 136, 138 show calculation of a new value for the program counter, which is to be incremented by 100. The result is stored in a temporary resource, represented by a rectangle 140, after which the program counter, now represented by a rectangle 142, is conditioned with its new value.

Figure 7:
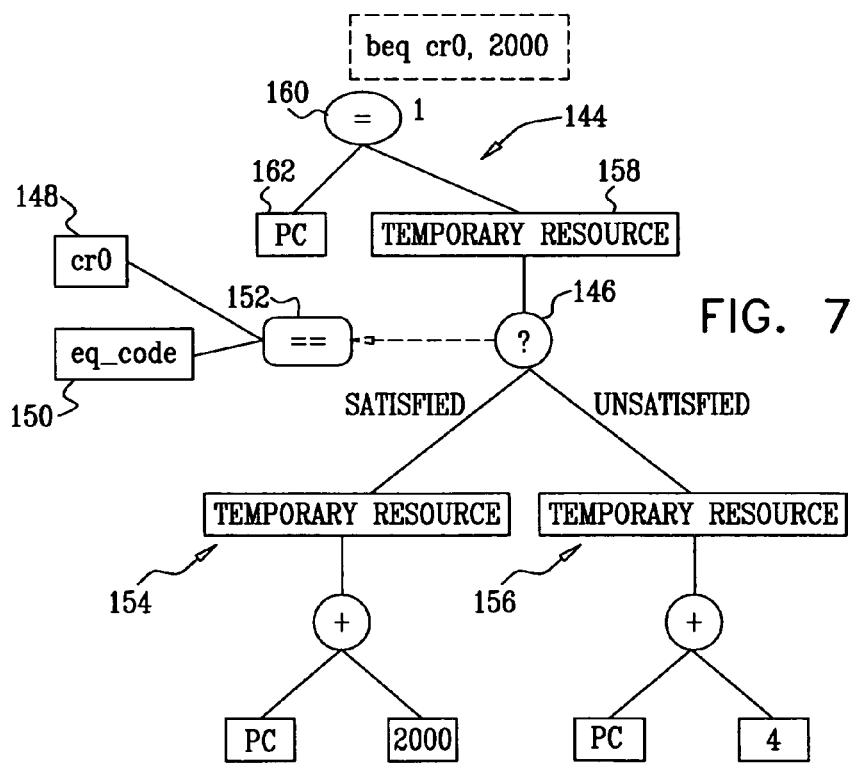
FIG. 7 is a tree-like representation of a more complex control flow machine instruction, in accordance with a disclosed embodiment of the invention.

Reference is now made to FIG. 7, which is a tree-like representation of a more complex control flow machine instruction 144, in accordance with a disclosed embodiment of the invention. The machine instruction 144 is an example of a conditional branch instruction beq ("branch if equal"). In this case the actual instruction is beq cr0, 2000. The condition tested is whether a condition register resource (the PowerPC conditional register cr0) is logically equal to zero. In order to model this instruction using expression trees, a new symbol is introduced. A rounded rectangle indicates logical equivalence.

A circle 146 contains a resolution operator (?), which is applied to a condition in which a condition resource cr, shown as a rectangle 148 is logically compared with an equivalence code (eq_code), shown as a rectangle 150. The condition of logical equivalence is represented as a rounded rectangle 152. If it is determined by the resolution operator that the condition is satisfied, the branch is taken, and a subtree 154 models incrementation of the program counter by 2000. Otherwise, the branch is not taken, and a subtree 156 models incrementation of the program counter by four. This is done in the same manner as described above in the discussion of FIG. 6 and is not repeated. The new value of the program counter is held in a temporary resource, indicated by a rectangle 158. An assignment operator (=), contained by a circle 160, then conditions the program counter, now represented by a rectangle 162, with its new value.

Post-Link Optimization.

As an example of the application of expression trees to post-link optimization, the tree-like structure used to model the beq instruction (FIG. 7) is very powerful when considering algebraic simplification and constant folding that could not be achieved at compile time. In FIG. 7, the state of the conditional register cr0 (rectangle 148) may be known if it is the result of a previous compare instruction applied to some resources, for example the instruction cmpli cr0, 0x0, r0, 0x3. The instruction cmpli is a PowerPC comparison instruction ("Compare Logical Immediate") that compares the contents of a general-purpose register RA with a concatenation of other values, and sets a bit in the PowerPC condition register field (BF). The register r0 may hold a known constant, e.g., the constant eight. Here the resource cr0 would not hold a code that satisfies the equivalence condition in a subsequent beq instruction. Here the cmpli instruction compares the value of r0, with the constant three. Since the value of the register r0 is assumed to be eight, they are not equal, thus not satisfying the equivalence condition.

By propagating the value of the resource cr0 to the beq instruction, the condition resource becomes always false, and the unsatisfied edge of the resolution operator (the subtree 156) is always taken. Thus, the entire branch reduces to a trivial sequence, PC=PC+4, which is equivalent to a NOP (no operation) instruction. Therefore, by replacing the resource cr0 with an immediate value in the condition resource and then calling a simplified method for this abstract instruction, the post-link optimizer would cause the instruction to change its form and become a NOP instruction.

Educational Applications.

Expression trees as described above have been found to facilitate understanding of machine instructions when displayed in human-readable form and incorporated in educational materials such as user manuals and machine documentation. Reference is now made to FIG. 8, which is a portion of a user manual describing the PowerPC instruction addi, in accordance with a disclosed embodiment of the invention. In addition to conventional textual description and tables, an expression tree 164 is shown at the right of the figure. The expression tree 164 differs slightly in form from the addi machine instruction 60 (FIG. 3), in that the rectangle 72, showing a temporary resource, is omitted, as it is an implementation detail that is not essential to understanding the functionality of the instruction. The expression tree 164 more clearly sets out the machine resources employed in the execution of the addi instruction. It may be noted that the size property of the registers RT and RA are 32-bit or 64-bit, depending on the target machine model. The value DS is a sign-extended 32-bit value.

Example

In this example, an expression tree form was generated from a machine instruction. The description of the machine instruction was written in an Excel® file, shown in Listing 1 of the computer program listing appendices.

Next a VBA program was employed to convert the description of Listing 1 to a XML (Extended Markup Language) file, which is shown in Listing 2 of the computer program listing appendices.

The XML file of Listing 2 was processed by a graphical design interface application, StyleVision® 2005, available from Altova, Inc., 900 Cummings Center, Suite 314 T, Beverly, Mass. 01915-6181. The StyleVision output is XSLT (Extensible Stylesheet Language Transformation) code (Altova XMLSpy Professional Edition, version 2005, release 3), which is shown in Listing 3 of the computer program listing appendices. The code of Listing 3 is submitted to the well known C preprocessor cpp to develop c++ code for compilation.

Listing 4 of the computer program listing appendices is the output of the preprocessor cpp for this Example, and comprises known .NET framework classes. Execution of the resulting c++ code produces a corresponding form of the input program in the form of data structures that represent expression trees.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for computer program optimization, comprising the steps of:
representing first machine instructions of a first program comprising post-linked execution code having a function therein as respective expression trees having nodes and leaves and edges, the nodes representing assignment operators, calculation operators, and resolution operators, and logical equivalence operators, and resources, the edges representing execution paths between the nodes, and the leaves representing machine resources and operations;
reorganizing at least a portion of the expression trees in the function of the first program to form reorganized expression trees
that represent second machine instructions that are fewer in number than the first machine instructions;
generating a second program of transformed code by respectively replacing the first machine instructions with the second machine instructions; and
converting the transformed code into a third program of post-linked execution code that includes the second machine instructions in the function.

2. The method according to claim 1, wherein the expression trees have additional nodes that represent other machine resources.

3. The method according to claim 1, wherein converting the transformed code comprises generating optimized rearrangements of the transformed code.

4. The method according to claim 1, wherein the steps of representing first machine instructions and generating a second program comprise the steps of:
describing the first machine instructions as a first text;
converting the first text to a markup language format;
converting the markup language format to source code acceptable to a compiler;
compiling the source code to yield executable code; and
executing the executable code to generate the expression trees.

5. The method according to claim 1, wherein the step of representing first machine instructions comprises representing one of the first machine instructions by a plurality of the expression trees.

6. The method according to claim 1, further comprising the step of displaying the expression trees as human-readable expression trees for user education.

7. The method according to claim 1, wherein reorganizing at least a portion of the expression trees comprises replacing a branch of a control flow instruction by a no operation (NOP) instruction.

8. A computer software product for computer program optimization, including a non-transitory computer-readable storage medium in which computer program instructions are stored, which instructions, when executed by a computer, cause the computer to perform a method comprising the steps of:
representing first machine instructions of a first program comprising post-linked execution code having a function therein as respective expression trees having nodes and leaves and edges, the nodes representing assignment operators, calculation operators, and resolution operators, and logical equivalence operators, and resources, the edges representing execution paths between the nodes, and the leaves representing machine resources and operations;
reorganizing at least a portion of the expression trees in the function of
the first program to form reorganized expression trees
that represent second machine instructions that are fewer in number than the first machine instructions;
generating a second program of transformed code by respectively replacing the first machine instructions with the second machine instructions; and
converting the transformed code into a third program of post-linked execution code that includes the second machine instructions in the function.

9. The computer software product according to claim 8, wherein converting the transformed code comprises generating optimized rearrangements of the transformed code.

10. The computer software product according to claim 8, wherein the steps of representing first machine instructions and generating a second program comprise the steps of:
describing the first machine instructions as a first text;
converting the first text to a markup language format;
converting the markup language format to source code acceptable to a compiler;
compiling the source code to yield executable code; and
executing the executable code to generate the expression trees.

11. The computer software product according to claim 8, wherein reorganizing at least a portion of the expression trees comprises replacing a branch of a control flow instruction by a no operation (NOP) instruction.

12. A data processing system for computer program optimization, comprising:
a processor;
a memory accessible to the processor storing programs and data objects therein, wherein execution of the programs cause the processor to perform the steps of:
representing first machine instructions of a first program comprising post-linked execution code having a function therein as respective expression trees having nodes and leaves and edges, the nodes representing assignment operators, calculation operators, and resolution operators, and logical equivalence operators, and resources, the edges representing execution paths between the nodes, and the leaves representing machine resources and operations;
reorganizing at least a portion of the expression trees
in the function of the first program to form reorganized expression trees
that represent second machine instructions that are fewer in number than the first machine instructions;
generating a second program of transformed code by respectively replacing the first machine instructions with the second machine instructions; and converting the transformed code into a third program of post-linked execution code that includes the second machine instructions in the function.

13. The data processing system according to claim 12, wherein the steps of representing first machine instructions and generating a second program comprise the steps of:
describing the first machine instructions as a first text;
converting the first text to a markup language format;
converting the markup language format to source code acceptable to a compiler;
compiling the source code to yield executable code; and
executing the executable code to generate the expression trees.

\* \* \* \* \*